US 10,060,523 B2

(12) United States Patent
Pinschmidt et al.

(10) Patent No.: US 10,060,523 B2
(45) Date of Patent: Aug. 28, 2018

(54) ACTIVE DIFFERENTIAL AND MOTOR VEHICLE

(71) Applicant: AUDI AG, Ingolstadt (DE)

(72) Inventors: Udo Pinschmidt, Gaimersheim (DE); Thomas Schels, Kipfenberg-Schelldorf (DE)

(73) Assignee: Audi AG, Ingolstadt (DE)

( * ) Notice: Subject to any disclaimer, the term of this patent is extended or adjusted under 35 U.S.C. 154(b) by 344 days.

(21) Appl. No.: 15/100,103

(22) PCT Filed: Nov. 11, 2014

(86) PCT No.: PCT/EP2014/003021
§ 371 (c)(1),
(2) Date: May 27, 2016

(87) PCT Pub. No.: WO2015/078560
PCT Pub. Date: Jun. 4, 2015

(65) Prior Publication Data
US 2018/0186232 A1 Jul. 5, 2018

(30) Foreign Application Priority Data
Nov. 11, 2014 (DE) .................. 10 2013 019 906

(51) Int. Cl.
*F16H 59/46* (2006.01)
*B60K 23/04* (2006.01)
(Continued)

(52) U.S. Cl.
CPC ............ *F16H 59/46* (2013.01); *B60K 17/16* (2013.01); *B60K 23/04* (2013.01); *B60W 10/023* (2013.01);
(Continued)

(58) Field of Classification Search
CPC .............. B60K 17/16; B60K 2023/043; B60Y 2300/82; F16H 48/06; F16H 48/36;
(Continued)

(56) References Cited

U.S. PATENT DOCUMENTS 5,443,429 A * 8/1995 Baxter, Jr. ......... B60K 17/3467
475/204
6,062,330 A * 5/2000 Watson ................ B60K 17/342
180/197
(Continued)

FOREIGN PATENT DOCUMENTS

CN 1871463 A 11/2006
CN 101070903 A 11/2007
(Continued)

OTHER PUBLICATIONS

International Search Report issued by the European Patent Office in International Application PCT/EP2014/003021.
(Continued)

*Primary Examiner* — Leslie A Nicholson, III
(74) *Attorney, Agent, or Firm* — Henry M Feiereisen, LLC

(57) ABSTRACT

An active differential for the controlled distribution of a drive torque generated by a drive motor to two drive shafts includes a planetary gear train configured to couple the two drive shafts to a drive shaft of the drive motor, and a distributor motor including a distributor shaft. The distributor motor produces a torque, with a distribution of a drive torque to the two drive shafts being dependant on the torque produced by the distributor motor. The distributor shaft and the planetary gear train are coupled by a coupling device which only transmits a torque from the planetary gear train to the distributor shaft when a rotational speed difference between rotational speeds of the two output shafts exceeds a predetermined limit value and when a connection condi-
(Continued)

tion depending on an operating condition of the distributor motor is satisfied.

21 Claims, 2 Drawing Sheets

(51) Int. Cl.
| | |
|---|---|
| *B60W 10/16* | (2012.01) |
| *B60W 30/18* | (2012.01) |
| *B60W 20/20* | (2016.01) |
| *B60W 10/02* | (2006.01) |
| *F16H 48/36* | (2012.01) |
| *F16H 48/06* | (2006.01) |
| *B60K 17/16* | (2006.01) |
| *F16H 48/20* | (2012.01) |
| *F16H 48/34* | (2012.01) |

(52) U.S. Cl.
CPC ............ *B60W 10/16* (2013.01); *B60W 20/20* (2013.01); *B60W 30/18145* (2013.01); *F16H 48/06* (2013.01); *F16H 48/36* (2013.01); *B60K 2023/043* (2013.01); *B60W 2520/266* (2013.01); *B60W 2520/28* (2013.01); *B60Y 2300/82* (2013.01); *B60Y 2400/404* (2013.01); *B60Y 2400/416* (2013.01); *B60Y 2400/425* (2013.01); *F16H 2048/204* (2013.01); *F16H 2048/343* (2013.01); *F16H 2048/364* (2013.01)

(58) Field of Classification Search
CPC ............... F16H 59/46; F16H 2048/204; F16H 2048/343; F16H 2048/364
See application file for complete search history.

(56) References Cited

U.S. PATENT DOCUMENTS

| | | | |
|---|---|---|---|
| 9,945,466 B2* | 4/2018 | Pinschnnidt | ........... B60K 17/16 |
| 2004/0220011 A1 | 11/2004 | Gumpoltsberger et al. | |
| 2010/0025131 A1 | 2/2010 | Gloceri et al. | |
| 2012/0083378 A1 | 4/2012 | Severinsson et al. | |
| 2015/0065293 A1* | 3/2015 | Ando | ....................... B60K 6/52 477/1 |
| 2015/0337937 A1* | 11/2015 | Rodriguez | ............. B60K 23/04 475/5 |

FOREIGN PATENT DOCUMENTS

| | | |
|---|---|---|
| DE | 35 42 059 C1 | 6/1987 |
| DE | 196 80 744 B4 | 12/1997 |
| DE | 102 46 839 A1 | 4/2004 |
| DE | 10 2005 026 874 A1 | 12/2006 |
| DE | 10 2009 056 366 A1 | 6/2011 |
| DE | 10 2010 045 502 A1 | 3/2012 |
| DE | 10 2010 049 550 A1 | 4/2012 |

OTHER PUBLICATIONS

Chinese Search Report dated Sep. 4, 2017 with respect to counterpart Chinese patent application 201480064921.2.

Translation of Chinese Search Report dated Sep. 4, 2017 with respect to counterpart Chinese patent application 201480064921.2.

* cited by examiner

ACTIVE DIFFERENTIAL AND MOTOR VEHICLE

CROSS-REFERENCES TO RELATED APPLICATIONS

This application is the U.S. National Stage of International Application No. PCT/EP2014/003021, filed Nov. 11, 2014, which designated the United States and has been published as International Publication No, WO 2015/078560 and which claims the priority of German Patent Application, Serial No. 10 2013 019 906.9, filed Nov. 28, 2013, pursuant to 35 U.S.C. 119(a)-(d).

BACKGROUND OF THE INVENTION

The invention relates to an active differential for the controlled distribution of a drive torque generated by a drive motor to two output shafts, including a planetary gear train for coupling the output shafts to a drive shaft of the drive motor and a distributor shaft to a distributor motor, wherein the distribution of drive torque to the output shafts depends on a torque exerted by the distributor motor.

Active differentials are used to distribute drive torques to several, in particular two, output shafts. The differential thus allows the two output shafts to have different rotational speeds. When the differential is operated without an additional distributor motor or a complete or partial locking of the differential, the same torques are transmitted to both output shafts. Active intervention in a differential which changes the torque distribution to the output shafts depending on a further introduced torque allows a flexible distribution of torques.

Active differentials are used in particular in motor vehicles for the distribution of the drive torque from a drive motor to the driven wheels of the motor vehicle. In the automotive segment, the use of such an active differential is often referred to as "torque vectoring" or "active yaw". The use of an active differential in the motor vehicle allows in particular an active influencing of the yaw angle of the motor vehicle, since the torques to the individual wheels and thus the forces being transmitted to the respective wheel on the roadway can be separately controlled or adjusted by the active differential.

In active differentials, even very small differences in speed between the output shafts lead to rotation of the distributor shaft and thus the distributor motor. Since a relatively small-sized motor is typically to be used as a distributor motor, a translation between the rotational speed difference of the drive axles and the distributor shaft is typically provided in order to be able to generate large torque differences between the drive axles with the relatively small-scale distributor motor. Therefore, small differences in rotational speed between drive axles can already lead to a continuous rotation of the distributor motor with a medium rotational speed. This can lead to steady charging and discharging of the battery with low currents, additional mechanical stresses and in particular an uneven load of clocked power electronics. Thus, both the electrical and the mechanical components of the active differential are already stressed at minimum rotational speed differences.

In particular, when an active differential is used in a motor vehicle, however, such strains can occur over long periods, such as when the tires of the motor vehicle are worn unevenly and thus when driving there is always a small difference in rotational speed between the drive axles which are coupled with the tires, or when the weight shift in the motor vehicle is uneven. Even very small steering movements, as they are typically continuously performed by drivers, lead to continual strain on the active differential.

SUMMARY OF THE INVENTION

The invention is thus based on the object of specifying an active differential, whose electrical and mechanical components are less stressed by small differences in rotational speed between the drive axles at a low load.

The object of the invention is solved by an active differential of the aforementioned type, wherein the distributor shaft and the planetary gear train are coupled by a coupling device that only transmits a torque from the planetary gear train to the distributor shaft when the rotational speed difference between the rotational speeds of the output shafts exceeds a predetermined limit value, as well as complying with a connection condition that depends on an operating state of the distributor motor.

The invention is based on the idea that the initially described transmission of small rotational speed differences between the output shafts to the distributor motor is disadvantageous and it is therefore advantageous to prevent speed-dependent torque transmission, at least in the direction of the distributor motor. In the simplest case, the coupling device can completely decouple the distributor shaft from the planetary gear train when the rotational speed difference between the rotational speeds of the output shafts is below a specified limit value. This is particularly possible since the rotation of the distributor shaft in the coupled state is performed with a rotational speed that corresponds to the rotational speed difference between the drive axles scaled with a translation factor. The rotational speed of the distributor shaft itself in the coupled state, or the rotational speed of a shaft which couples the planetary gear train to the coupling device, can thus be regarded as a quantity that is proportional to the rotational speed difference. It can therefore be considered as dependent on the rotational speed difference as well as on this proportional rotational speed. In the simplest case, the coupling device may be realized by a coupling which couples the elements to be coupled only at a predetermined minimum rotational speed, for example, as a correspondingly designed centrifugal clutch. Of course, it is also possible to measure the rotational speed difference or the rotational speed proportional to the rotational speed difference by a sensor, to compare to a limit value using a switching or a control device and to correspondingly control a controllable, particularly electrically controllable coupling device.

It should hereby be possible to also control the active differential by applying a torque through the distributor motor in the cases when the rotational speed difference between the drive axles is slight. For example, it is possible when using the differential in the motor vehicle, that a higher torque will be transmitted specifically to one of the wheels when starting up or stopping on the mountain or when driving over an obstacle such as a curb or similar in order to overcome the obstacle or to compensate for a not fully horizontal roadway, which turn wheels of the motor vehicle and thus the drive axles however with identical or nearly identical rotational speed. To control the differential by a torque of the distributor motor, however, a torque from the distributor shaft on the planetary gear train has to be transmitted. However, in doing so, a counter-torque is transmitted from the planetary gear train to the distributor shaft. Therefore, it is advantageous that the coupling device according to the invention transmits torque in a manner independent of rotational speed from the planetary gear train to the distributor shaft when complying with the connection condition that depends on the operating state of the distributor motor. The connection condition can, in this way, especially evaluate an energization of the distributor motor and/or a control of the distributor motor for generating a torque.

This is easily possible when a controllable coupling device is involved that is controlled by a control device. The control device can basically control the coupling device for coupling the planetary gear train to the distributor shaft, when there is a situation in which a torque is to be transmitted deliberately. Basically, however, it is also possible to form the coupling device mechanically in such a way that a torque transmission between distributor shaft and planetary gear train is possible when falling below a rotational speed difference during operation of the distributor motor for generating a torque.

The coupling device may in particular be a centrifugal clutch or include a centrifugal clutch. A centrifugal clutch can be easily designed so that a coupling between the planetary gear train and the distributor shaft then takes place exactly when a predetermined rotational speed of the planetary gear train or a connecting shaft between planetary gear train and coupling device is exceeded. Since the connecting shaft has a rotational speed which is proportional to the rotational speed difference between the rotational speeds of the output shafts, a centrifugal clutch can be used in order to couple a planetary gear train to a distributor shaft only when a predetermined rotational speed difference is exceeded.

Alternatively, the coupling device may be a viscous clutch or include a viscous clutch. In that way, the viscous clutch can have a defined torque closure from a predetermined minimum rotational speed and transmit no or minimal torque at low rotational speeds. This applies for the viscous clutch as for the centrifugal clutch mentioned above.

It is advantageous when the coupling device includes a locking device, wherein the coupling device is configured for the rotational speed-independent transmission of torque from the planetary gear train to the distributor shaft and from the distributor shaft to the planetary gear train with active locking device. In doing so, the differential can in particular include a control device which is configured to activate the locking device when complying with the connecting condition that depends on an operating state of distributor motor. In doing so, the operating state, which leads to an activation of the locking device, in particular, can be an energization of the distributor motor, wherein a current limit value is provided in particular, at whose crossing over the locking device is activated. However, it is also possible that information is provided for the control device, on which the control of the distributor motor is also based. It is thus possible, for example, that a motor vehicle system for control of the distributor motor for generating a defined torque also has the torque target value of the control device so that this is activated when controlling the distributor motor for generating the torque or when exceeding a predetermined limit value by which the torque target value can activate the locking device. Thus, it is possible, for example, to energize a magnet with the energization of the motor, which activates the locking device, or to activate the locking device depending on the torques acting in the coupling device.

Alternatively or in addition to the use of elements of the coupling device, which simply mechanically induce or separate a coupling of the planetary gear train and distributor shaft depending on the rotational speed difference, it is possible to use especially electrically controlled elements of the coupling device. It is advantageous when the differential includes a sensor for detecting the rotational speed difference and a control device, wherein the coupling device includes a coupling element that in a connected state, transmits a torque from a planetary gear train to the distributor shaft and from the distributor shaft to the planetary gear train, and does not transmit a torque in a disconnected state, wherein the control device is configured to control the coupling element depending on the rotational speed difference for switching between the connected state and the disconnected state.

The sensor may be arranged in particular on a shaft whose rotational speed is proportional to the rotational speed differential, especially to the distributor shaft or a shaft which leads from the planetary gear train to the coupling device. The use of a sensor and a control device has in particular the advantage that a very flexible control of the coupling element is possible. With this flexible control, one can easily achieve, especially even at low rotational speed differentials, the possibility of transmitting torque from the distributor shaft to the planetary gear train. In addition, it is easily possible to adjust the predetermined limit when using a control device. In the differential according to invention, the torque transmission should be prevented from the planetary gear train to the distributor shaft particularly for continual, yet small rotational speed differences between the rotational speeds of the drive shafts. In particular, for use in a motor vehicle, it is advantageous to configure this limit variable since, for example, the rotational speed differences caused by various retractions of the tires may change over a certain time. Therefore, the predetermined limit value can be adjusted for use in a control device of the coupling device depending on changes of the average rotational speed differences over longer time periods.

The control device may hereby be configured in particular for the presence of a connection condition that depends on a operating state of the distributor motor, regardless of the rotational speed difference, to control the coupling element for the change into and for the remaining in the connected state. The connection condition can, in this way, particularly evaluate the operating state of the distributor motor. The evaluation of the operating state of the distributor motor can performed as explained above for the activation of a locking device.

The coupling elements can be designed in various ways. The coupling element may thus be a magnetic coupling, wherein at least one magnet of the magnetic coupling can be controlled by the control device for switching between the connected and the disconnected state. Magnetic couplings can be controlled in which the position of a disk or the arrangement of a magnetic powder or a magnetic fluid is changed by switching a magnet, so that, depending on the switching of the electromagnet, the coupling element connects or disconnects the distributor shaft and the planetary gear train. By using a magnetic coupling, a particularly simply designed electrically controllable coupling element can be formed.

Alternatively, the coupling element may include at least one coupling actuator, which can be controlled by the control device for switching between the connected and disconnected states and which is designed to move at least one mechanical element of the coupling element. Depending on the specific requirements for the coupling device in the active differential, such a controllable mechanical coupling can be advantageous as a coupling element. In this case, the coupling actuator can especially move the disks of a disk coupling.

As explained above, a torque transmission can then in particular be achieved only in one direction at low engine speeds, when the coupling device includes a freewheel. Therefore, the coupling device may include at least a freewheel coupling the distributor shaft and the planetary gear train and a locking element associated to the freewheel, wherein a locking position of the locking element is locked to the freewheel and a free rotation of the distributor shaft in relation to the planetary gear train is possible in an open position of the locking element in a predetermined rotational direction, and wherein the position of the locking element depends on the rotational speed difference. The position of the locking element can be changed, in particular by an actuator, which is controlled by a control device. Alternatively, however, the locking element may also be mechanically designed such that it is moved depending on rotational speed between an open position of the locking element and a locking position. For example, a centrifugal clutch or a viscous clutch, each with an additional catch, can be used so that, for example, a freewheel is reached in a separation of the centrifugal clutch, and a torque transmission in both directions is possible with a connection of the centrifugal clutch.

Since, typically, a torque transmission from the distributor motor to the planetary gear train should be possible in both directions, in particular two freewheels which have opposite locking directions can be provided in the coupling element, wherein the locking elements are separately controllable, in particular by a control device. Alternatively, however, the locking elements can also be designed and arranged such that they are moved depending on the rotational speed and rotational direction between the locking position and the open position as a result of the mechanical interaction effects in the coupling device.

Furthermore, the invention relates to a motor vehicle including a differential according to one of the embodiments described above. As explained above, it is possible in particular when using an active differential in the motor vehicle, that small differences in rotational speed continuously occur between the wheels and thus between the drive axles and thus the mechanical and electrical components of the active differential are unnecessarily stressed. It is therefore advantageous to use a differential according to the invention, which transmits a torque from the planetary gear train to the distributor shaft only when the rotational speed difference between the rotational speeds of the drive shafts exceeds a predetermined limit value as well as when complying with a connection condition that depends on a operating state of the distributor motor.

The output shafts may in particular each be coupled to a wheel of the motor vehicle.

BRIEF DESCRIPTION OF THE DRAWING

Further advantages and details of the invention will become apparent from the following embodiments and the accompanying drawings. They show.

DETAILED DESCRIPTION OF PREFERRED EMBODIMENTS

Figure 1:
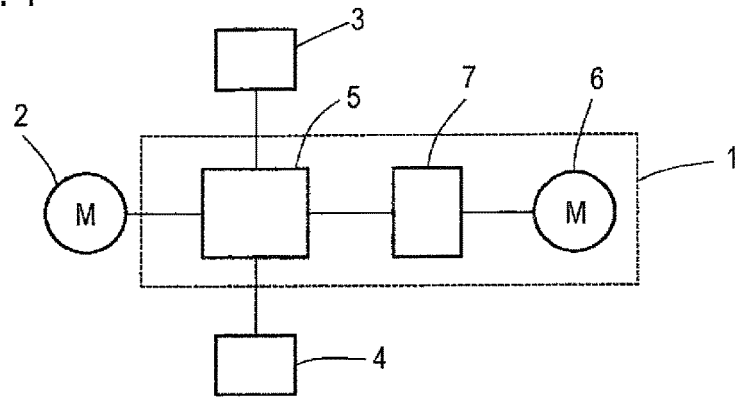
FIG. 1 schematically an embodiment of the active differential according to the invention, FIG. 2 schematically a further embodiment of the active differential according to the invention, FIG. 3 the coupling device of a third embodiment of the active differential according to the invention, and FIG. 4 an embodiment of the motor vehicle according to the invention.

FIG. 1 shows an embodiment of an active differential 1 for the controlled distribution of a drive torque generated by a drive motor to two output shafts 3, 4. The coupling of the drive motor 2 and the drive shaft to the output shafts 3, 4 takes place through the planetary gear train 5 of the differential 1. In addition to the planetary gear train 5, the differential 1 includes a distributor motor 6, wherein the distribution of drive torque to the output shafts 3, 4 depends on the torque exerted by the distributor motor 6. The distributor motor 6 is coupled via a distributor shaft to the coupling device 7, which in turn is coupled to the planetary gear train 5. In a complete decoupling of the distributor shaft from the planetary gear train 5 by the coupling device 7, the differential has 1 the behavior of a non-locked differential, so that the torque generated by the drive motor 2 is equally distributed to the output shafts 3 and 4. When the distributor shaft coming from the distributor motor 6 is connected to the planetary gear train 5 by the coupling device 5, the torque of the distributor motor 6 thus controls the distribution of the drive torque to the output shafts 3 and 4.

For large rotational speed differences between the output shafts 3 and 4, the coupling device 7 should couple the distributor shaft with the planetary gear train 5. When the rotational speed difference between the rotational speeds of the output shafts 3 and 4, is small however, the coupling device 7 should decouple the distributor shaft at least such from the planetary gear train 5 so that no torque from the planetary gear train 5 can be transmitted to the distributor shaft and thus to the distributor motor 6. To achieve this, the coupling device 7 is designed such that it transmits a torque from the planetary gear train 5 to the distributor shaft only when the rotational speed difference between the rotational speeds of the output shafts 3, 4, exceeds a predetermined limit value as well as energization of the distributor motor 8. This utilizes that, due to the coupling of the output shafts 3, 4 to a connecting shaft which connects the planetary gear train 5 to the coupling device 7, this connection shaft has a rotational speed which corresponds to the rotational speed difference between the output shafts 3 and 4 scaled with a translation factor of the planetary gear train 5. A limit value for the rotational speed difference between the rotational speeds of the output shafts 3, 4 corresponds to a derived limit value for the rotational speed of the connecting shaft.

Since the connecting shaft is coupled directly to the coupling device 7, a coupling device can be used as a coupling device 7, which induces a rotational speed-dependent coupling of the connecting shaft to the distributor shaft. The desired function of the coupling device is concretely achieved through this so that the coupling device is a centrifugal clutch. The centrifugal clutch is designed such that at low rotational speeds, the connecting shaft is not coupled to the distributor shaft, but after having reached a certain minimum rotational speed, a coupling of connecting shaft and distributor shaft occurs and therefore of planetary gear train 5 and distributor motor 6. In doing this, a magnet is additionally provided on the centrifugal clutch, which is also energized for energization of the distributor motor 6 and when energized the centrifugal clutch connects regardless of rotational speed.

Figure 2:
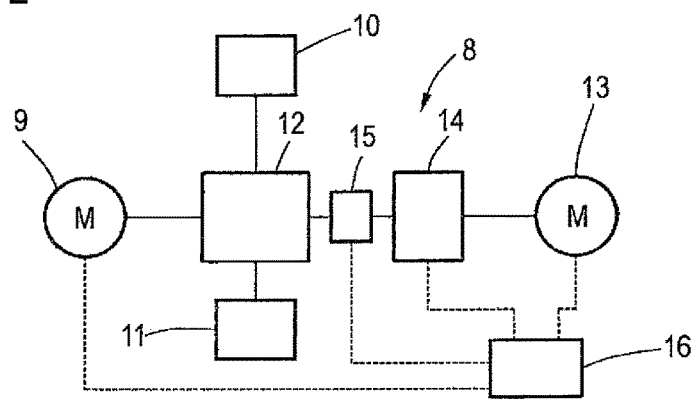

An advantageous development of the active differential 1 shown in FIG. 1 is shown in FIG. 2. The active differential 8 is substantially designed as differential 1 shown in FIG. 1, wherein it differs from differential 1 shown in FIG. 1 by the design of the coupling device 14 and by the additional use of a sensor 15 and a control device 16. Like differential 1 shown in FIG. 1, a drive torque of the drive motor 9 is distributed to the output shafts 10 and 11 in the embodiment according to FIG. 2 by the planetary gear train 12 of the differential 8. Here, the distributor motor 13 is coupled to the planetary gear train 12 via the distributor shaft and the coupling device 14. A sensor is additionally arranged between intermediate planetary gear train 12 and coupling device 14, which detects the rotational speed of the distributor shaft 12 and coupling device 14. The data detected by the sensor 15 are made available to the control device 16. The control device 16 thereby controls the drive motor 9, the distributor motor 13 and the coupling device 14 depending on the rotational speed detected by sensor 15 and in addition data present in the motor vehicle.

The coupling device 14 is hereby configured as a magnetic coupling which connects or does not connect the distributor shaft to the planetary gear train 12 depending on a control signal of the control device 16. The control device 16 detects the rotational speed detected by the sensor 15 for controlling the coupling device. Since the control device 16 also controls the distributor motor 13, information about the target torque is also present in the control device 16, which is to be exerted by the distributor motor 13. The control of the coupling device 14, thus the energizing or the non-energizing of the electromagnet of the magnetic coupling, occurs depending both on the target torque for the distributor motor 13 and the rotational speed of the distributor shaft detected by the sensor 15. When the distributor motor 13 is controlled in order to generate a target torque, the coupling device 15 is always controlled in order to connect the connecting shaft and the distributor shaft. However, when there is no control of the distributor motor 13 for generating a torque, control of the coupling device 14 takes place depending on the rotational speed of the distributor shaft detected by the sensor 15. When the detected rotational speed is lower than or equal to a threshold value, the coupling device 14 is controlled in order to separate the distributor shaft and the connecting shaft and thus the planetary gear train 12 and the distributor motor 13. When the rotational speed exceeds the limit value, the coupling device 14 is controlled by the control device 16 in order to connect the connecting shaft and the distributor shaft and thus the planetary gear train 12 and the distributor motor 13. It is therefore possible with the active differential 8 independent of rotational speed to transmit torque from the distributor shaft and thus the distributor motor 13 to the planetary gear train 12 and thus to actively affect the distribution of the torque of the drive motor 9 to the output shafts 10, 11. At the same time, however, a transmission of torque to the distributor motor 13 is prevented due to low rotational speed differences.

In an alternative, not separately shown embodiment of an active differential, it is also possible for the coupling device to be mechanically configured such that a torque transmission only takes place, when the connection shaft has a certain minimum rotational speed, i.e. designed, for example, as a centrifugal clutch, in addition, however a locking device is provided on the coupling device, which on activation, leads to a rotational speed-independent transmission of torque from the distributor shaft to the planetary gear train. Such a locking device may be designed as an actuator which actuates a locking pin. In this case, the additional sensor can be omitted, since the rotational speed-dependent control of the coupling device is accomplished solely by the mechanical structure of the coupling device. In this case, the locking device of the coupling device can be activated by the control device if and when the distributor motor is controlled to generate torque. Thus the same function of the active differential is achieved as that of the differential 8 as above-described with respect to FIG. 2.

Figure 3:
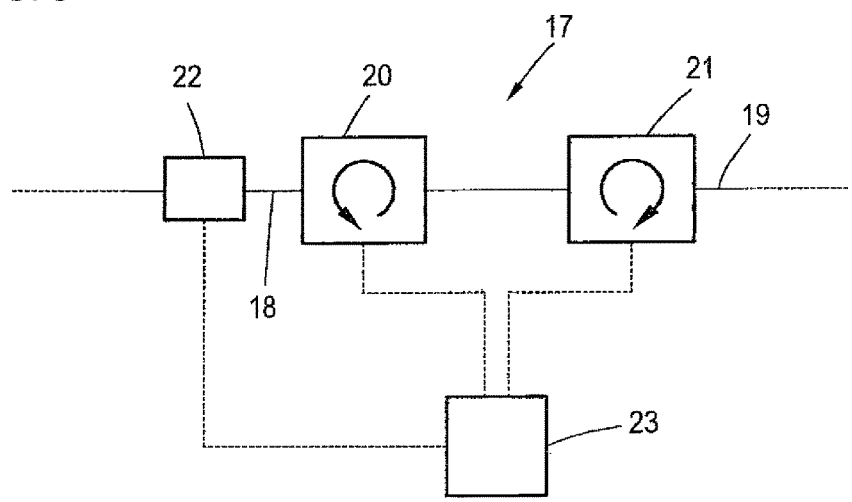

FIG. 3 shows a further possible embodiment of a coupling device of an active differential. The coupling device 17 couples the connecting shaft 18 which connects the coupling device 17 and the not-shown planetary gear train to the distributor shaft 19 which connects the coupling device 17 to the not-shown distributor motor. The coupling device 17 thereby includes two freewheels 20, 21 which each have an opposing freewheeling direction. Without additional elements, this would mean that a free rotation of the connecting shaft 18 in relation to the distributor shaft 19 is possible at all times. Therefore, the freewheels 20, 21 include additionally locking elements which lock the freewheels in a locking position and lead to a tight coupling of the shafts of the freewheel in both directions. The locking elements are each separate by the control device 23 from an open position in which a free rotation in the rotation direction predetermined for the respective freewheel 20, 21 is possible, able to be brought into a locking position in which the freewheel is locked. When a rotational speed is detected by the rotational speed sensor 22 arranged on the connecting shaft 18 which are above a predetermined limit, the control device 23 controls the locking elements in such a way that the freewheels 20 and 21 are locked, that is, a torque transmission in both directions is possible. When the rotational speed detected with the sensor 22 however, is below the limit value, and a torque is additionally to be transmitted from the not-shown distributor motor to the not-shown planetary gear train, the locking element of one of the freewheels 20, 21 is controlled by control device 23 in such a way that it is brought into the open position and the locking element of the other of the freewheels 20, 21 is controlled in such way that it is brought into the locking position. A torque transmission from distributor motor to the planetary gear train in a predetermined direction of rotation is thus possible, but small differences in rotational speed between the drive axles can also be filtered in a rotation direction when using the distributor motor to distribute the torque of the drive motor to the drive axles.

Figure 4:
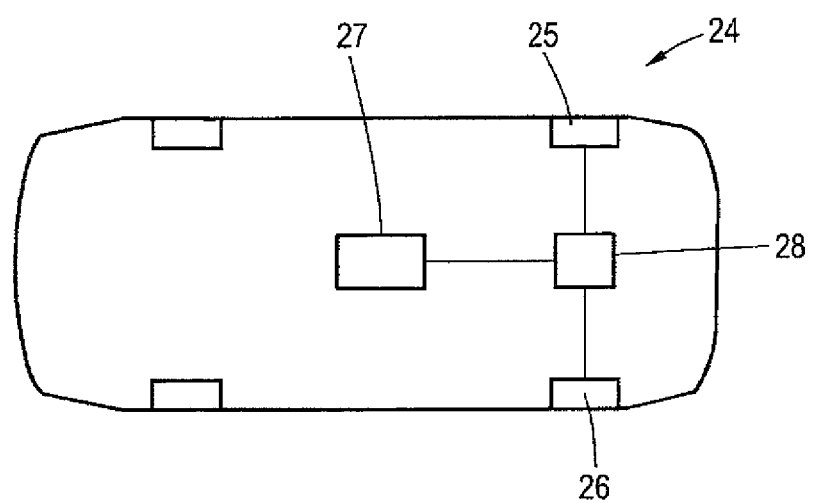

FIG. 4 shows an embodiment of a motor vehicle which includes an active differential. The motor vehicle 24 has a rear wheel drive, wherein the rear wheels 25, 26 are operated by the drive motor 27. The distribution of the drive torque provided by the drive motor 27 to the wheels 25, 26 is performed by the active differential 28. The active differential 28 is constructed in accordance with the differential 1 shown in FIG. 1. Alternatively, a construction of the differential 28 in accordance with the differential 8 shown in FIG. 2 or according to one of the other explained embodiments would also be possible of course.

What is claimed is:
1. An active differential for the controlled distribution of a drive torque generated by a drive motor to two drive shafts, comprising:
   a planetary gear train configured to couple the two drive shafts to a drive shaft of the drive motor;
   a distributor motor including a distributor shaft, said distributor motor producing a torque, with a distribution of a drive torque to the two drive shafts being dependant on the torque produced by the distributor motor; and a coupling device coupling the distributor shaft and the planetary gear train and configured to only transmit a torque from the planetary gear train to the distributor shaft when a rotational speed difference between rotational speeds of the two output shafts exceeds a predetermined limit value and when a connection condition depending on an operating condition of the distributor motor is satisfied.

2. The active differential of claim 1, wherein the coupling device is a centrifugal clutch or includes a centrifugal clutch.

3. The active differential of claim 1, wherein the coupling device is a viscous clutch or includes a viscous clutch.

4. The active differential of claim 1, wherein the coupling device includes a locking device and is configured to effect a rotation-speed-independent transmission of torque from the planetary gear train to the distributor shaft and from the distributor shaft to the planetary gear train, when the locking device is activated.

5. The active differential of claim 4, further comprising a control device configured to activate the locking device, when the connection condition that depends on the operating condition of the distributor motor is satisfied.

6. The active differential of claim 1, further comprising a sensor configured to detect the rotational speed difference, and a control device, said coupling device including a coupling element configured to transmit a torque in a connected state between the distributor shaft and the planetary gear train, from the planetary gear train to the distributor shaft and from the distributor shaft to the planetary gear train, and to be prevented in a disconnected state between the distributor shaft and the planetary gear from transmitting a torque, said control device being configured to control the coupling element such as to change between the connected state and the disconnected state in dependence on the rotational speed difference.

7. The active differential of claim 6, wherein the control device is configured to control the coupling element for changing to the connected state and to remain in the connected state in the presence of a connection state that depends an operating state of the distributor motor, regardless of the rotational speed difference.

8. The active differential of claim 6, wherein the coupling element is a magnetic clutch including at least one magnet controlled by the control device for changing between the connected and disconnected states.

9. The active differential of claim 6, wherein the coupling element includes at least one coupling actuator controlled by the control device for changing between the connected and disconnected states and configured to move at least one mechanical element of the coupling element.

10. The active differential of claim 1, wherein the coupling device includes at least one freewheel to couple the distributor shaft and the planetary gear train, and a locking element operably connected with the freewheel and movable in dependence on the rotational speed difference between a locked position in which the freewheel is locked and an open position in which the distributor shaft is able to freely rotate in relation to the planetary gear train to a predetermined relative rotational direction.

11. A motor vehicle, comprising:
two drive shafts;
a drive motor generating a drive torque; and
an active differential for distributing the drive torque to the two drive shafts, said active differential including a planetary gear train configured to couple the two drive shafts to a drive shaft of the drive motor, a distributor motor including a distributor shaft, said distributor motor producing a torque, with a distribution of a drive torque to the two drive shafts being dependant on the torque produced by the distributor motor, and a coupling device coupling the distributor shaft and the planetary gear train and configured to only transmit a torque from the planetary gear train to the distributor shaft when a rotational speed difference between rotational speeds of the two output shafts exceeds a predetermined limit value and when a connection condition depending on an operating condition of the distributor motor is satisfied.

12. The motor vehicle of claim 11, wherein each of the two drive shafts are coupled with a wheel of the motor vehicle.

13. The motor vehicle of claim 11, wherein the coupling device is a centrifugal clutch or includes a centrifugal clutch.

14. The motor vehicle of claim 11, wherein the coupling device is a viscous clutch or includes a viscous clutch.

15. The motor vehicle of claim 11, wherein the coupling device includes a locking device and is configured to effect a rotation-speed-independent transmission of torque from the planetary gear train to the distributor shaft and from the distributor shaft to the planetary gear train, when the locking device is activated.

16. The motor vehicle of claim 15, further comprising a control device configured to activate the locking device, when the connection condition that depends on the operating condition of the distributor motor is satisfied.

17. The motor vehicle of claim 11, further comprising a sensor configured to detect the rotational speed difference, and a control device, said coupling device including a coupling element configured to transmit a torque in a connected state between the distributor shaft and the planetary gear train, from the planetary gear train to the distributor shaft and from the distributor shaft to the planetary gear train, and to be prevented in a disconnected state between the distributor shaft and the planetary gear from transmitting a torque, said control device being configured to control the coupling element such as to change between the connected state and the disconnected state in dependence on the rotational speed difference.

18. The motor vehicle of claim 17, wherein the control device is configured to control the coupling element for changing to the connected state and to remain in the connected state in the presence of a connection state that depends an operating state of the distributor motor, regardless of the rotational speed difference.

19. The motor vehicle of claim 17, wherein the coupling element is a magnetic clutch including at least one magnet controlled by the control device for changing between the connected and disconnected states.

20. The motor vehicle of claim 17, wherein the coupling element includes at least one coupling actuator controlled by the control device for changing between the connected and disconnected states and configured to move at least one mechanical element of the coupling element.

21. The motor vehicle of claim 11, wherein the coupling device includes at least one freewheel to couple the distributor shaft and the planetary gear train, and a locking element operably connected with the freewheel and movable in dependence on the rotational speed difference between a locked position in which the freewheel is locked and an open position in which the distributor shaft is able to freely rotate in relation to the planetary gear train to a predetermined relative rotational direction.

* * * * *